(12) United States Patent
Tashiro

(10) Patent No.: US 7,976,704 B2
(45) Date of Patent: Jul. 12, 2011

(54) FILTRATION DEVICE

(75) Inventor: Minoru Tashiro, Tokyo (JP)

(73) Assignee: Bunri Incorporation, Miyakonojo-Shi, Miyazaki (JP)

( * ) Notice: Subject to any disclaimer, the term of this patent is extended or adjusted under 35 U.S.C. 154(b) by 0 days.

(21) Appl. No.: 12/466,916

(22) Filed: May 15, 2009

(65) Prior Publication Data

US 2009/0218268 A1 Sep. 3, 2009

Related U.S. Application Data

(63) Continuation of application No. PCT/JP2008/065457, filed on Aug. 28, 2008.

(30) Foreign Application Priority Data

Aug. 29, 2007 (JP) ................. 2007-222642

(51) Int. Cl.
B03C 1/02 (2006.01)
B01D 35/06 (2006.01)
(52) U.S. Cl. .................. 210/223; 210/222; 210/695
(58) Field of Classification Search .................. 210/222, 210/223, 695
See application file for complete search history.

(56) References Cited

U.S. PATENT DOCUMENTS

| | | | |
|---|---|---|---|
| 2,452,220 A | 10/1946 | Bower | |
| 7,504,032 B2 * | 3/2009 | Tashiro | 210/223 |
| 2008/0093285 A1 | 4/2008 | Tashiro | |

FOREIGN PATENT DOCUMENTS

| | | |
|---|---|---|
| JP | 11-77479 | 3/1999 |
| JP | 2006-305417 | 11/2006 |
| JP | 2007-105706 | 4/2007 |

OTHER PUBLICATIONS

International Search Report established in PCT/JP2008/065457, Sep. 22, 2008.
Search Report of Intellectual Property Office of Singapore regarding Singapore Patent Application No. 200903334-1, Oct. 20, 2009.
Supplementary European Search Report and Search Opinion for PCT/JP2008/065457, Sep. 10, 2010.

* cited by examiner

*Primary Examiner* — David A Reifsnyder
(74) *Attorney, Agent, or Firm* — Bacon & Thomas, PLLC

(57) ABSTRACT

A filtration device is provided with a filter tank, filter media unit, and magnet. The filter media unit includes a filter media accommodation case and a large number of magnetic granular filter media. The magnet is movable between first and second positions. In the first position, a magnetic field is applied to the magnetic granular filter media, so that the magnetic granular filter media magnetically attract one another. In the second position, magnetic attraction between the magnetic granular filter media is canceled. The filter media accommodation case includes a nonmagnetic mesh member of a nonmagnetic material and magnetism intensification plate of a magnetic material. When the magnet is in the first position, the magnetic granular filter media and nonmagnetic mesh member are located between the magnetism intensification plate and the magnet.

6 Claims, 6 Drawing Sheets

FILTRATION DEVICE

CROSS-REFERENCE TO RELATED APPLICATIONS

This is a Continuation Application of PCT Application No. PCT/JP2008/065457, filed Aug. 28, 2008, which was published under PCT Article 21(2) in Japanese as WO 2009/028630.

This application is based upon and claims the benefit of priority from prior Japanese Patent Application No. 2007-222642, filed Aug. 29, 2007, which is published as JP 2009-050829 and the entire contents of which are incorporated herein by reference.

BACKGROUND OF THE INVENTION

1. Field of the Invention

The present invention relates to a filtration device for filtering a contaminated fluid containing fine particles.

2. Description of the Related Art

A machine tool for precision machining, for example, uses a fluid such as a coolant for lubricating or cooling a part being machined. As the workpiece is machined, fine particles such as dust, carbon, etc., as well as chips, are mixed into the fluid of this type, so that the fluid is gradually polluted and inevitably becomes contaminated.

A filtration device for filtering a contaminated fluid is disclosed in Jpn. Pat. Appln. KOKAI Publication No. 11-77479. This filtration device uses chips, which are produced from a machine tool, as filter media, and magnetizes the filter media by means of an electromagnetic coil, thereby capturing magnetic impurities in the contaminated fluid.

Since the conventional filtration device described above uses chips as the filter media, its filtration accuracy varies considerably. Since the surfaces of the chips used as the filter media are very rough, moreover, it is difficult to wash the filter media in order to recover the filtration capability when the filtration capability is reduced. Thus, there is a problem that the chips as the filter media must be replaced frequently.

The inventor hereof has developed a filtration device that uses easily washable, spherical magnetic metal balls, such as steel balls, and attracts and fixes the magnetic metal balls by means of a magnet. This filtration device is disclosed in Jpn. Pat. Appln. KOKAI Publication No. 2007-105706. This filtration device has high filtration accuracy and its filter media can be washed with ease.

A filter media unit of the filtration device using the magnetic metal balls includes a filter media accommodation case and a large number of magnetic metal balls contained in the filter media accommodation case. The filter media accommodation case is composed of a pair of mesh members, upper and lower, formed of punching metals (magnetic substance) of iron, a stainless-steel frame member surrounding the mesh members, and the like. However, an earnest investigation by the inventor hereof revealed room for improvement in the conventional filter media unit.

Specifically, if a weak magnet is used in the conventional filter media unit using the magnetic metal balls, attraction of the magnetic metal balls is liable to become unsatisfactory in positions distant from the magnet, although the magnetic metal balls can be fully attracted in positions near the magnet. In consequence, the ability to capture objects to be removed is low in positions distant from the magnet. In the conventional filtration device, for example, a magnetic force obtained at a position farthest from the magnet may sometimes be about a fourth of that obtained near the magnet, so that desired filtration accuracy cannot be obtained, in some cases. Thus, it is necessary to use a larger, stronger magnet. A large, strong magnet, however, requires great drive energy when it is incorporated into or removed from the filter media unit, so that there are problems of enlargement of a drive mechanism and increased energy consumption.

BRIEF SUMMARY OF THE INVENTION

The present invention provides a filtration device capable of displaying higher accuracy filtration performance by using magnetic granular filter media and magnets.

A filtration device of the present invention comprises a filter tank into which a contaminated fluid containing fine particles to be removed is introduced, a filter media unit contained in the filter tank, and a magnet which applies a magnetic field to the filter media unit. In the filtration device, the filter media unit includes a filter media accommodation case and a large number of magnetic granular filter media of a magnetic material contained in the filter media accommodation case. The magnet is movable with respect to the filter media unit between a first position and a second position, and is configured to apply the magnetic field to the magnetic granular filter media, thereby causing the magnetic granular filter media to magnetically attract and fix one another, when in the first position and to cancel the magnetic attraction between the magnetic granular filter media when in the second position.

The filter media accommodation case is provided with a nonmagnetic mesh member of a nonmagnetic material, which supports the magnetic granular filter media and has a large number of circulation holes through which the contaminated fluid is passable, and a magnetism intensification plate formed of a magnetic material and provided on an end portion of the nonmagnetic mesh member. The magnetism intensification plate is configured to be horizontally opposed to the magnet so that the nonmagnetic mesh member and the magnetic granular filter media are located between the magnet and the magnetism intensification plate when the magnet is in the first position.

According to the present invention, the filter media accommodation case that contains the magnetic granular filter media is provided with the nonmagnetic mesh member of the nonmagnetic material and the magnetism intensification plate of the magnetic material. Therefore, the magnetic granular filter media that are located far from the magnet can also be caused to satisfactorily attract one another by the magnetic force of the magnet. Thus, the filtration accuracy near an end portion of the filter media unit can be prevented from being reduced, so that the filtration accuracy can be improved. In addition, the magnetic force of the magnet can be effectively used for the entire filter media unit, so that it is unnecessary to use an unduly large, strong magnet. Thus, a drive mechanism or the like for moving the magnet can be made energy-saving.

The nonmagnetic mesh member is formed of, for example, a flat stainless-steel plate. The large number of circulation holes with an opening width smaller than the diameter of the magnetic granular filter media are formed in the plate.

In a preferred aspect of the present invention, a first magnet and a second magnet are arranged horizontally spaced apart from each other in the filter tank. A first filter media unit and a second filter media unit are arranged horizontally adjacent to each other between the first magnet and the second magnet. A magnetism intensification plate of the first filter media unit and a magnetism intensification plate of the second filter media unit are magnetically connected to each other.

In a preferred aspect of the present invention, moreover, a third filter media unit is located between the first magnet and one sidewall of the filter tank. A magnetism intensification plate of the third filter media unit is magnetically connected to the one sidewall, and a fourth filter media unit is located between the second magnet and the other sidewall of the filter tank. A magnetism intensification plate of the fourth filter media unit is magnetically connected to the other sidewall.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to FIGS. 1 to 7.

Figure 1:
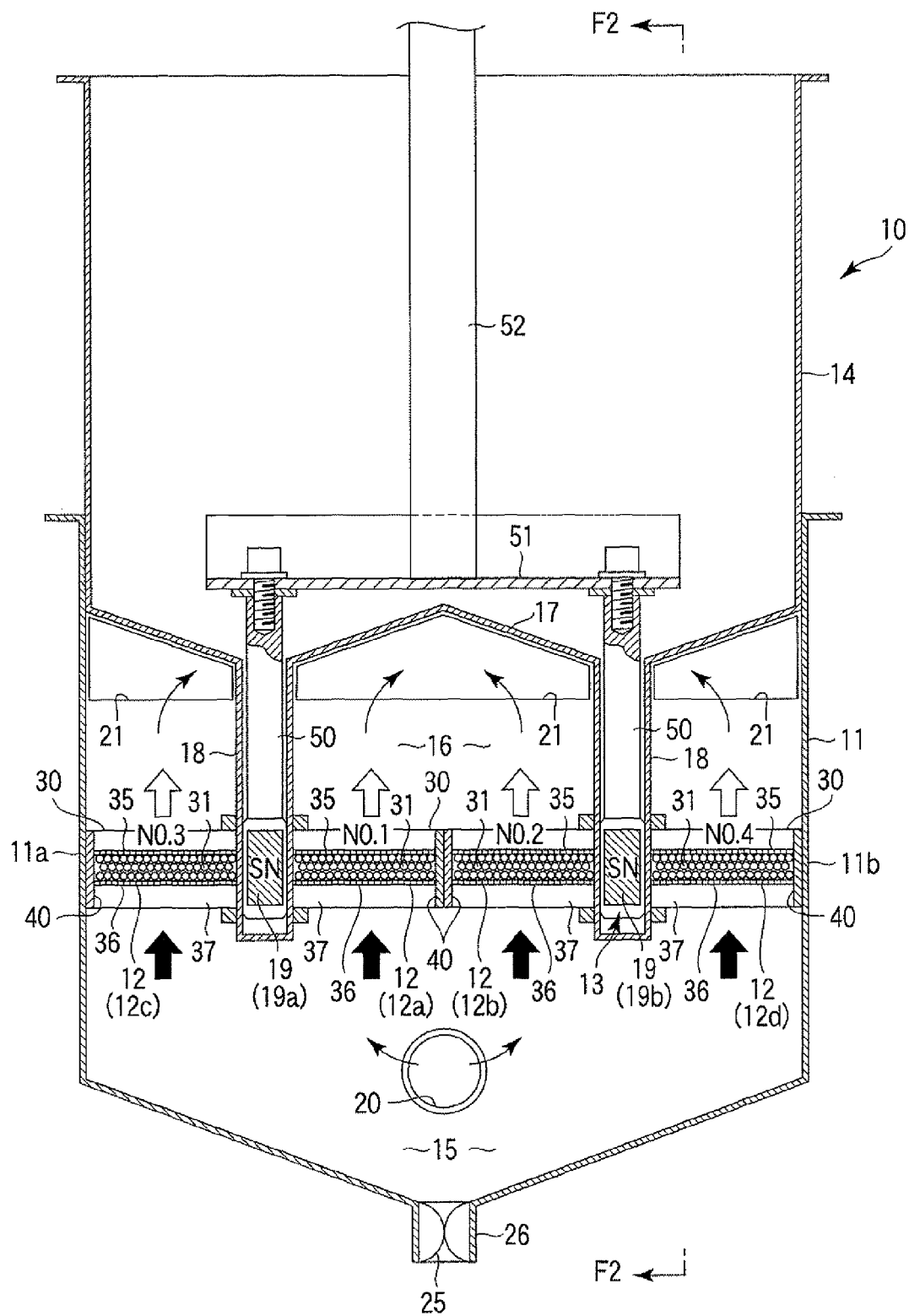
FIG. 1 is a longitudinal sectional view of a filtration device according to an embodiment of the present invention.

A filtration device 10 shown in FIG. 1 is provided with a filter tank 11, filter media units 12, and magnet units 13. The material of the filter tank 11 is a magnetic material, such as a ferrous metal. A cover housing 14 is disposed on top of the filter tank 11. A dirty chamber 15 and clean chamber 16 are defined in the filter tank 11.

The dirty chamber 15 is located under the filter media units 12. The clean chamber 16 is located over the filter media units 12. The top of the clean chamber 16 is airtightly closed by a partition wall 17. Magnet holders 18 are formed below the partition wall 17. The magnet holders 18 extend vertically. Magnets 19 are contained in the magnet holders 18, individually.

A contaminated fluid inlet 20 that opens into the dirty chamber 15 is formed in a lower part of the filter tank 11. A contaminated fluid that contains fine particles to be filtered is introduced into the dirty chamber 15 through the contaminated fluid inlet 20. A clean fluid outlet 21 that opens into the clean chamber 16 is formed in an upper part of the filter tank 11.

Figure 2:
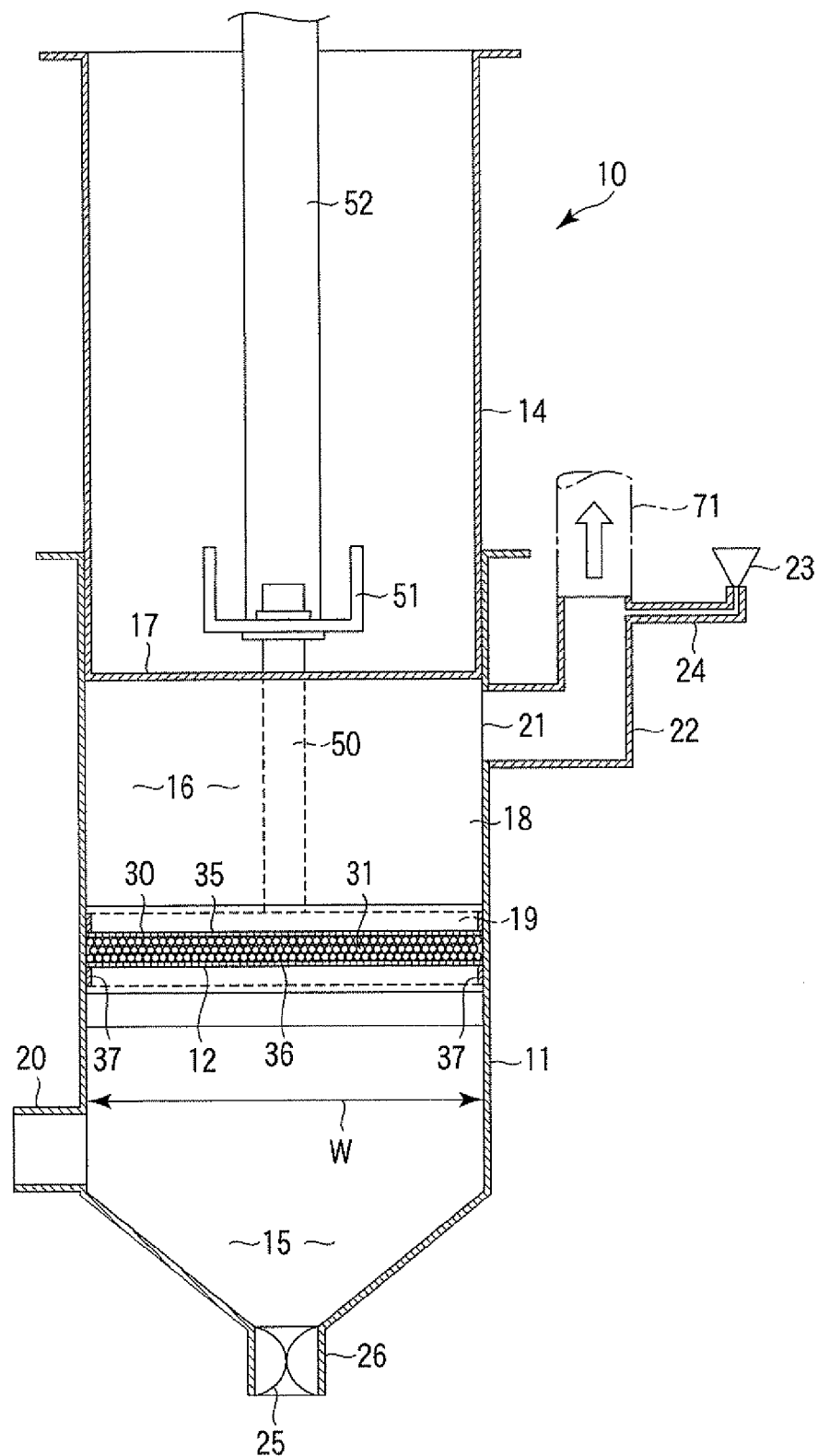
FIG. 2 is a longitudinal sectional view of the filtration device taken along line F2-F2 in FIG. 1.

As shown in FIG. 2, a clean fluid pipe 22 is connected to the clean fluid outlet 21. The clean fluid pipe 22 is connected with an air supply pipe 24 that is provided with an air valve 23 for use as atmospheric pressure releasing means. The clean chamber 16 can be opened to the atmosphere by opening the air valve 23. Alternatively, the air supply pipe 24 may be connected with a source of compressed air supply. In this case, compressed air can be supplied to the clean chamber 16. A drain port 26 with a drain valve 25 is provided at the bottom of the filter tank 11, that is, at the bottom of the dirty chamber 15.

The filter media unit 12 is constructed in the manner described below.

Figure 3:
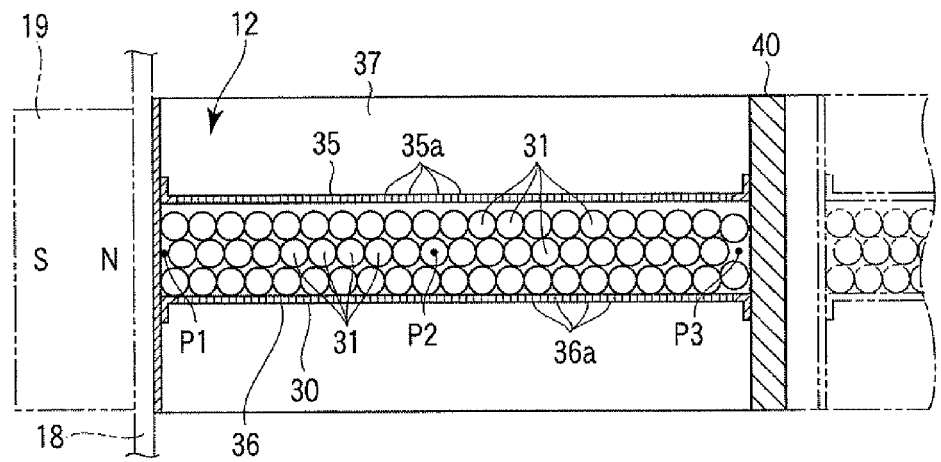
FIG. 3 is a sectional view enlargedly showing a filter media unit of the filtration device shown in FIG. 1.

FIG. 3 is a sectional view enlargedly showing the filter media unit 12. This filter media unit 12 includes a filter media accommodation case 30, which will be described below, and a large number of magnetic granular filter media 31 contained in the filter media accommodation case 30.

Figure 4:
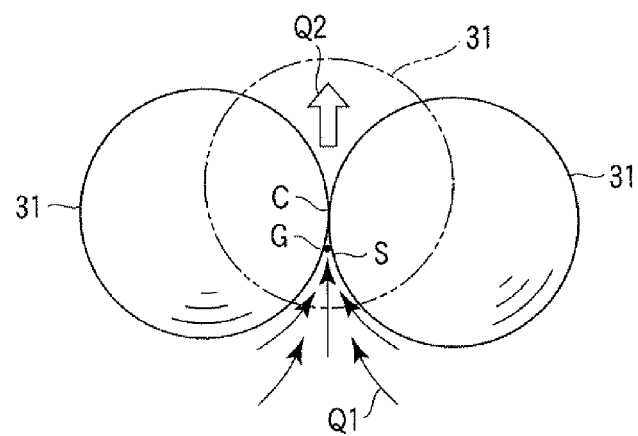
FIG. 4 is a side view showing a filtration operation of magnetic granular filter media of the filtration device shown in FIG. 1.

For example, the magnetic granular filter media 31 are spherical metal balls of a magnetic material, such as iron, and attract one another in the manner shown in FIG. 4 when subjected to a magnetic field. In a free state without application of any magnetic field, magnetic attraction is canceled, so that the magnetic granular filter media 31 can move relatively to one another to some extent. The surfaces of the magnetic granular filter media 31 are smooth and easily washable.

While the respective diameters of all the magnetic granular filter media 31 that are contained in the filter media accommodation case 30 may be equal to one another, a plurality of types of magnetic granular filter media 31 with different diameters may alternatively be mixed with one another. Further, magnetic granular filter media of a shape other than the spherical shape may be used. In short, the magnetic granular filter media 31 attract one another lest they move when subjected to a magnetic field by the magnet unit 13. When the magnetic field is removed, the magnetic granular filter media 31 are released from attraction. The magnetic granular filter media 31 should only be formed of a magnetic material and may be of any shape.

The filter media accommodation case 30 is composed of a pair of nonmagnetic mesh members 35 and 36, upper and lower, frame member 37, magnetism intensification plate 40, etc. The nonmagnetic mesh members 35 and 36 are formed of a nonmagnetic material, such as stainless steel (SUS304), and extend horizontally. The frame member 37 is disposed around the nonmagnetic mesh members 35 and 36. The magnetism intensification plate 40 is provided at respective end portions of the nonmagnetic mesh members 35 and 36. The frame member 37, like the nonmagnetic mesh members 35 and 36, is formed of a nonmagnetic material, such as stainless steel (SUS304). The magnetic granular filter media 31 are contained between the nonmagnetic mesh members 35 and 36. The magnetic granular filter media 31 are vertically arranged in a plurality of rows (e.g., three rows).

A large number of circulation holes 35a and 36a are formed in the nonmagnetic mesh members 35 and 36, respectively. The opening width of the circulation holes 35a and 36a is smaller than the diameter of the magnetic granular filter media 31. For example, the diameter of the magnetic granular filter media 31 is 4 mm, while the opening width of the circulation holes 35a and 36a ranges from 2 to 3 mm. Thus, the magnetic granular filter media 31 can be prevented from passing through the circulation holes 35a and 36a. The magnetic granular filter media 31 are put and supported on the lower nonmagnetic mesh member 36. The diameter of the magnetic granular filter media 31 may be greater than 4 mm.

For example, the nonmagnetic mesh members 35 and 36 are formed of punching metals of stainless steel. The punching metals are flat stainless-steel plates through which the circulation holes 35a and 36a are bored. Alternatively, flat reticulate members, duckboards, lattice members, or some other materials may be used for the nonmagnetic mesh members 35 and 36. In short, the nonmagnetic mesh members 35 and 36 should only be able to support the contained magnetic granular filter media 31 and be vertically penetrated by a fluid.

In the present embodiment, the nonmagnetic mesh members 35 and 36 used have a horizontally flat shape, so that the magnetic granular filter media 31 can be easily positioned with respect to one another. Thus, the magnetic granular filter media 31 can be regularly arranged in a plurality of rows on the nonmagnetic mesh member 36.

The magnetism intensification plate 40 is disposed on an end portion of the filter media unit 12, that is, that end portion thereof which is farther from the magnet 19. The magnetism intensification plate 40 is formed of a magnetic material, such as iron, with a thickness of, for example, about 3 mm, and is provided covering an overall transverse length W (shown in FIG. 2) of the filter media unit 12. When the magnet 19 is in a first position shown in FIG. 1, the magnetism intensification plate 40 is horizontally opposed to the magnet 19. The nonmagnetic mesh members 35 and 36 and magnetic granular filter media 31 are located between the magnet 19 and magnetism intensification plate 40. In other words, the magnetic granular filter media 31 and nonmagnetic mesh members 35 and 36 are provided between the magnet 19 and magnetism intensification plate 40.

The magnet 19 is contained in the magnet holder 18 and can move vertically. An example of the magnet 19 is a strong permanent magnet. This magnet 19 moves relatively to the filter media unit 12 between the first position shown in FIG. 1 and a second position shown in FIG. 5. When the magnet 19 is in the first position, a magnetic field is applied to the magnetic granular filter media 31. The magnetic granular filter media 31 are caused to magnetically attract one another to be fixed by this magnetic field. When the magnet 19 ascends to the second position, the magnetic attraction between the magnetic granular filter media 31 is canceled, so that the magnetic granular filter media 31 are allowed to move to some extent.

Figure 5:
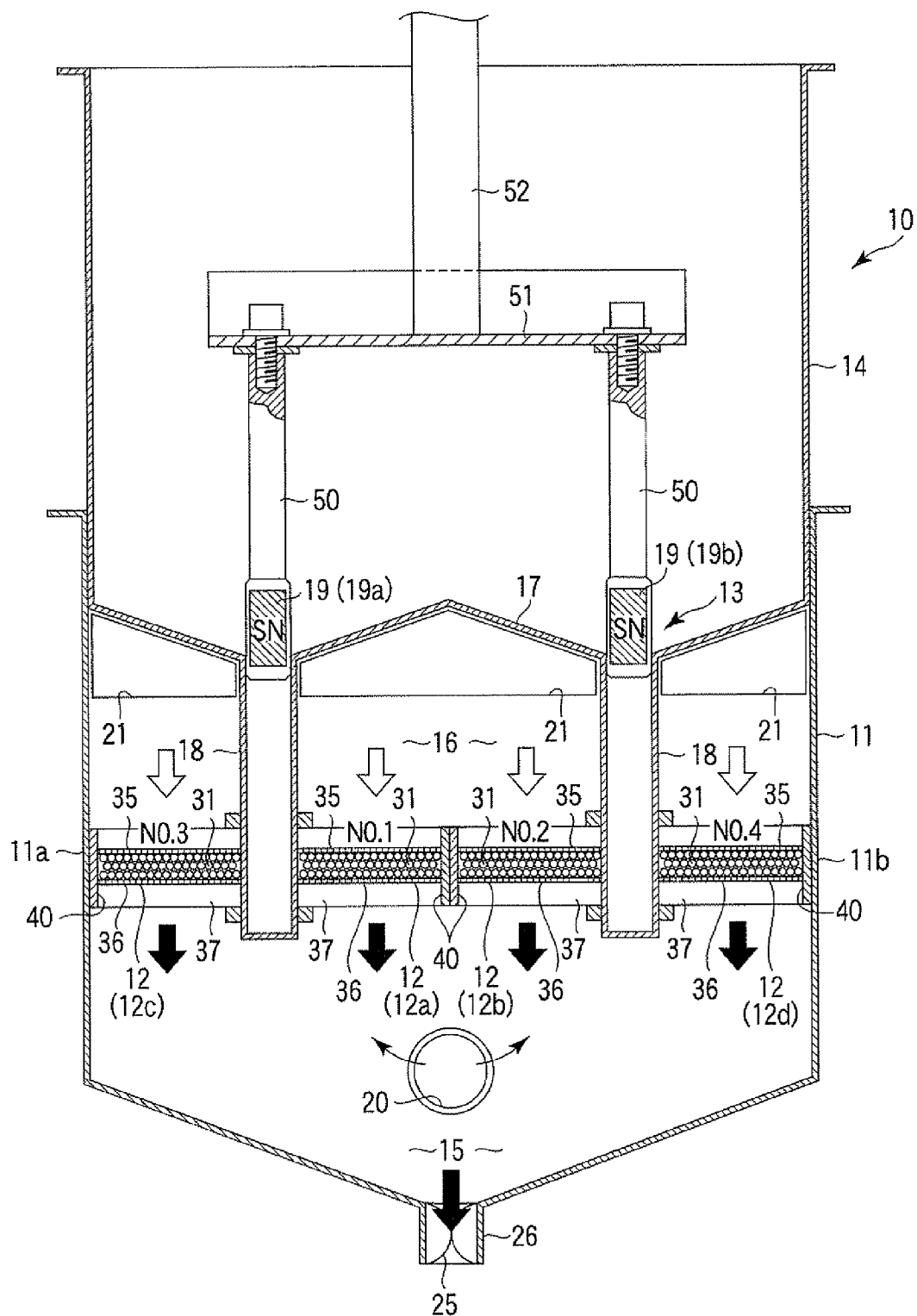
FIG. 5 is a longitudinal sectional view of the filtration device shown in FIG. 1 with its magnets raised.

The filtration device 10 is provided with retaining means for moving the magnets 19 between the first position (FIG. 1) and second position (FIG. 5). The restraining means is composed of lift rods 50 coupled individually to the magnets 19, horizontally extending connecting member 51, upwardly extending operating member 52, etc. The connecting member 51 connects the respective upper end portions of the lift rods 50.

The operating member 52 is fixed to the connecting member 51. The lift rods 50 are inserted individually into the magnet holders 18 and can vertically move together with the magnets 19. The operating member 52 can be vertically driven, manually or by means of an actuator (not shown), to move the magnets 19 between the first position and second position.

In the case of the present embodiment, as shown in FIG. 1, a first magnet 19a and second magnet 19b are arranged side by side in the filter tank 11, with a horizontal space between them. A first filter media unit 12a and second filter media unit 12b are arranged between the pair of magnets 19a and 19b. The constructions of these filter media units 12a and 12b are the same as that of the filter media unit 12 shown in FIG. 3. Each of the filter media units 12a and 12b includes magnetic granular filter media 31, a pair of nonmagnetic mesh members 35 and 36, upper and lower, and magnetism intensification plate 40.

The magnetism intensification plate 40 of the first filter media unit 12a and the magnetism intensification plate 40 of the second filter media unit 12b are in contact with each other. These filter media units 12a and 12b are located horizontally adjacent to each other with the magnetism intensification plates 40 magnetically connected to each other.

A third filter media unit 12c is located between the first magnet 19a and one sidewall 11a of the filter tank 11. The construction of the third filter media unit 12c is the same as that of the filter media unit 12 shown in FIG. 3. A magnetism intensification plate 40 of the third filter media unit 12c is in contact with the one sidewall 11a. The third filter media unit 12c is located between the first magnet 19a and the one sidewall 11a of the filter tank 11 with the magnetism intensification plate 40 magnetically connected to the sidewall 11a.

A fourth filter media unit 12d is located between the second magnet 19b and the other sidewall 11b of the filter tank 11. The construction of the fourth filter media unit 12d is the same as that of the filter media unit 12 shown in FIG. 3. A magnetism intensification plate 40 of the fourth filter media unit 12d is in contact with the other sidewall 11b. The fourth filter media unit 12d is located between the second magnet 19b and the other sidewall 11b of the filter tank 11 with the magnetism intensification plate 40 magnetically connected to the other sidewall 11b. Thus, the four filter media units 12a to 12d are arranged horizontally.

Figure 6:
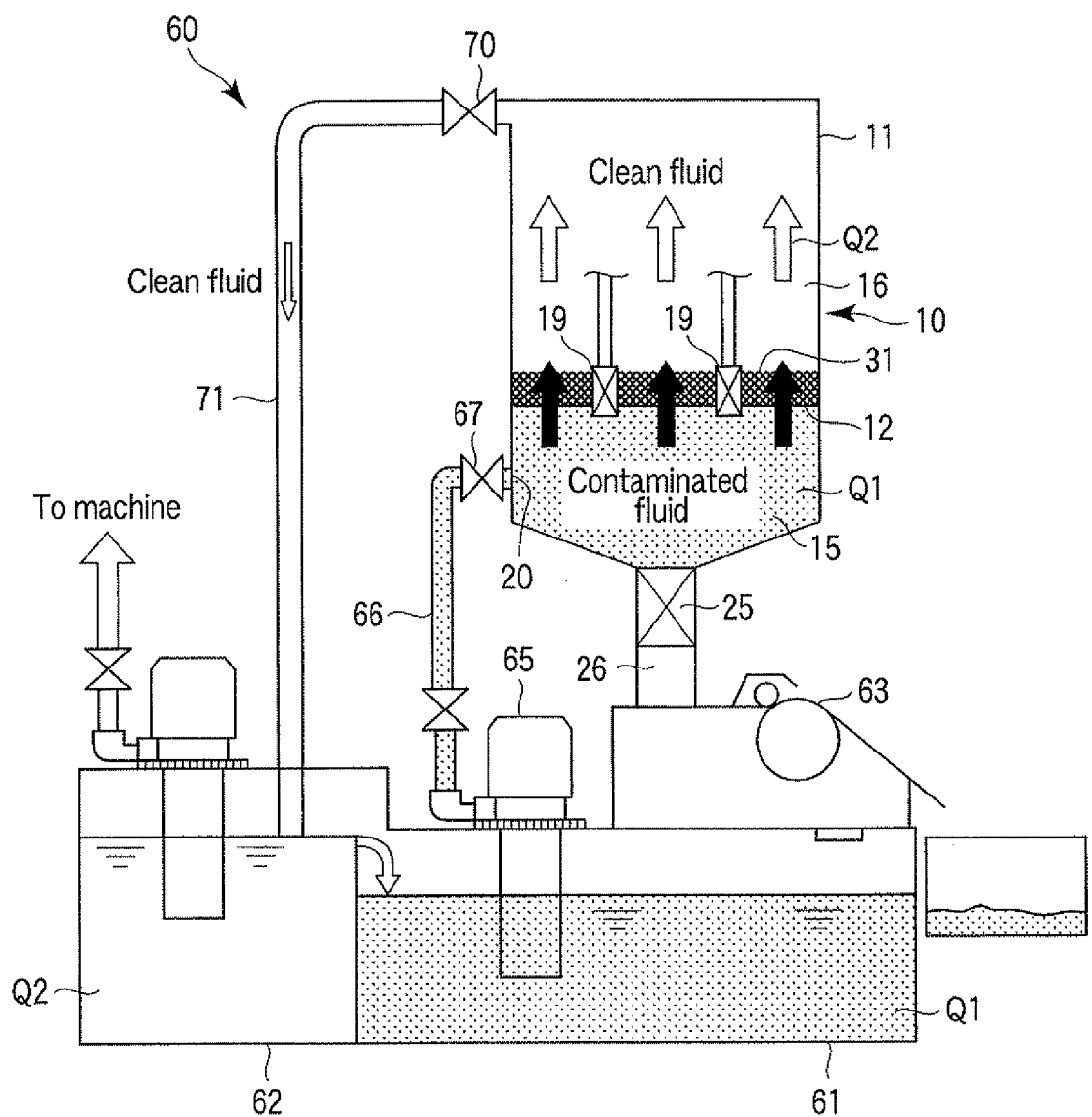
FIG. 6 is a sectional view typically showing a state in which filtration equipment with the filtration device shown in FIG. 1 is operated for filtration.
Figure 7:
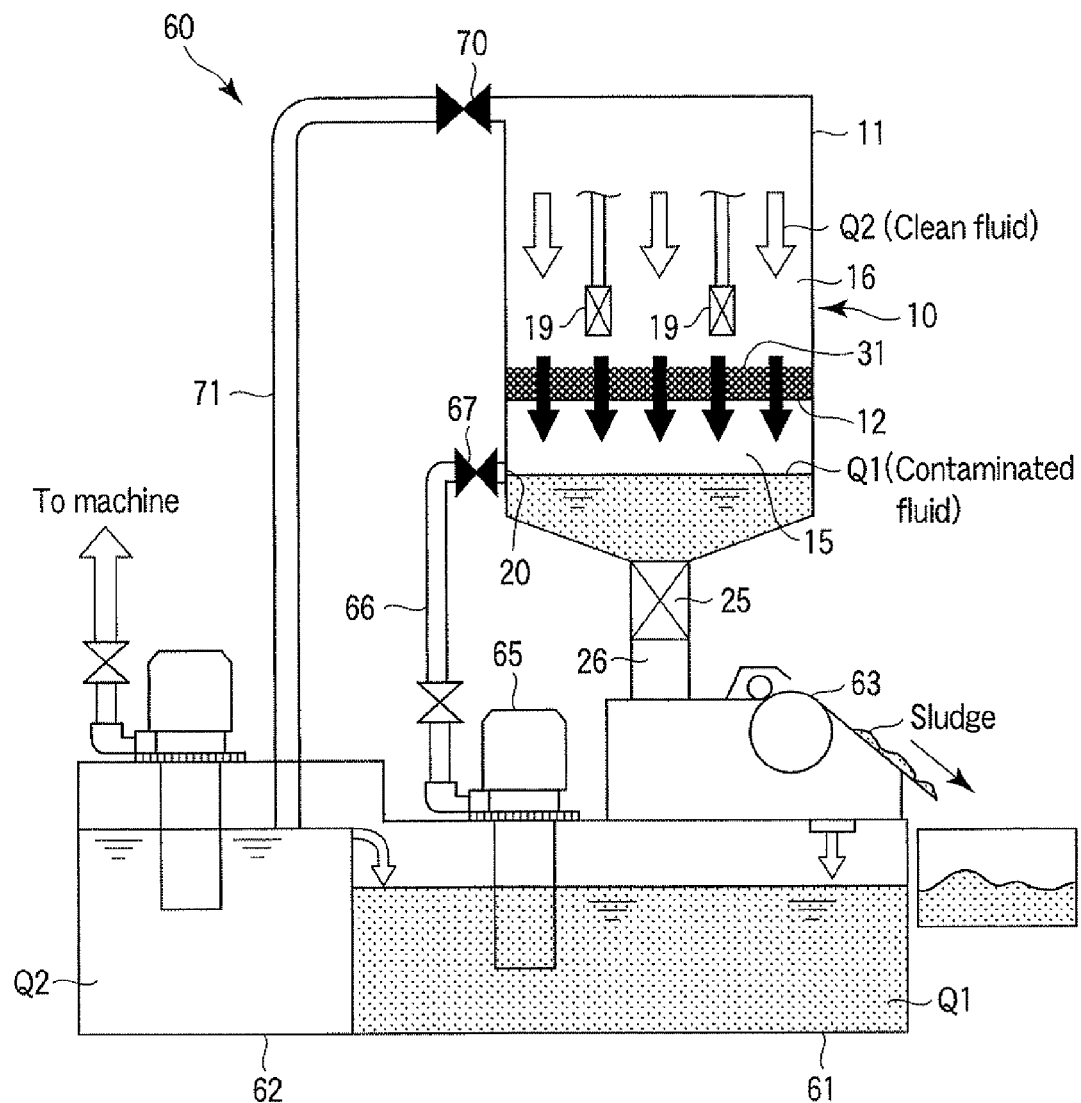
FIG. 7 is a sectional view typically showing a state in which the filtration equipment with the filtration device shown in FIG. 1 is operated for cleaning.

FIGS. 6 and 7 show an outline of filtration equipment 60 including the filtration device 10. The filtration equipment 60 is provided with a dirty tank 61, a clean tank 62, the filtration device 10, a sludge processor 63, etc. As shown in FIG. 6, a fluid Q1 that contains fine particles to be filtered is supplied to the contaminated fluid inlet 20 of the filtration device 10 through a pump 65, pipe 66, and valve 67. A clean fluid Q2 in the clean chamber 16 of the filtration device 10 is recovered into the clean tank 62 through a valve 70 and pipe 71.

In a filtration process for filtering the fluid Q1, as shown in FIG. 6, the valves 67 and 70 are opened, and the drain valve 25 is closed. Then, the fluid Q1 in the dirty tank 61 is supplied to the dirty chamber 15 of the filtration device 10 by means of the pump 65. Further, a magnetic field is applied to the magnetic granular filter media 31 by moving the magnets 19 of the magnet unit 13 to the first position (FIG. 1).

As shown in FIG. 4, the magnetic granular filter media 31 are fixed in contact with one another by this magnetic field. Thus, a narrow "wedge-shaped" gap G is formed so as to be tapered toward each point C of contact between the magnetic granular filter media 31. As the fluid Q1 flows near the contact point C between the magnetic granular filter media 31, fine particles S get deep into the gap G and are captured. If the fine particles S are formed of a magnetic material, the magnetized magnetic granular filter media 31 attract the fine particles S. Thus, the fluid Q1 supplied to the dirty chamber 15 is filtered as it upwardly passes through the filter media units 12 (12a to 12d), and the fluid Q1 flows into the clean chamber 16.

If the amount of fine particles S captured by the magnetic granular filter media 31 increases, the filtration performance is reduced. A cleaning process is executed to recover the filtration performance. In the cleaning process, the valves 67 and 70 are closed, as shown in FIG. 7, and the air valve 23 (shown in FIG. 2) is opened, whereby the interior of the clean chamber 16 is opened to the atmosphere. The pump 65 is stopped, and the drain valve 25 is opened. By moving the magnets 19 to the second position (FIG. 5), the magnetic field having been applied to the magnetic granular filter media 31 is canceled so that the magnetic granular filter media 31 are released from attraction.

Thereupon, the clean fluid Q2 in the clean chamber 16 passes through the filter media units 12 (12a to 12d) as it drops toward the dirty chamber 15 by its own weight. In doing this, the clean fluid Q2 in the clean chamber 16 may be quickly forced out toward the dirty chamber 15 by the pressure of compressed air supplied to the clean chamber 16 through the air supply pipe 24 (shown in FIG. 2).

As the clean fluid Q2 flows from the clean chamber 16 toward the dirty chamber 15, the surfaces of the magnetic granular filter media 31 are washed off with the clean fluid Q2. A sludge that contains a large amount of fine particles and the like discharged into the sludge processor 63 through the drain port 26 is separated from a liquid and recovered by the sludge processor 63.

As described above, the filtration device 10 of the present embodiment can perform the cleaning process as required when the filtration capability is reduced. In the cleaning process, the magnetic granular filter media 31 can be cleaned easily and quickly by using the clean fluid Q2 in the filter tank 11, as mentioned before, so that the filtration capability can be recovered in a short time. Since the filtration device 10 itself can be directly used for the cleaning, moreover, the running cost is low. The filtration device 10 may be operated in the filtration process or cleaning process that is selected by automatic switching by means of a timer.

In the filtration device 10 of the present embodiment, the filter media accommodation case 30 that contains the magnetic granular filter media 31 is provided with the nonmagnetic mesh members 35 and 36 formed of a nonmagnetic material and the magnetism intensification plate 40 formed of a magnetic material. Therefore, the magnetic granular filter media 31 that are located far from the magnets 19 can also be caused to satisfactorily attract one another by the magnetic force of the magnets 19. Thus, variations of the filtration accuracy of each part of the filter media units 12 can be reduced, so that the filtration accuracy can be improved. In addition, the magnetic force of the magnets 19 can be effectively used for all the filter media units 12. Accordingly, it is unnecessary to use unduly large, strong magnets, so that a drive mechanism or the like for moving the magnets 19 can be made energy-saving.

For the filter media unit 12 of the foregoing embodiment, the magnetic force that acts on the magnetic granular filter media 31 was measured. As a result, magnetic forces at a measuring point P1 near the magnet 19, intermediate measuring point P2, and measuring point P3 farthest from the magnet 19, as in FIG. 3, were 5,200, 2,750, and 2,200 gauss, respectively. In this case, the magnetic force of about 35 to 40% of that obtained at the point near the magnet 19 was able to be obtained even at the position farthest from the magnet 19, so that a suitable attractive force for high-precision filtration was able to be obtained.

In a comparative example that is not provided with the magnetism intensification plate 40, on the other hand, magnetic forces at the measuring point PI near the magnet 19, intermediate measuring point P2, and measuring point 23 farthest from the magnet were 5,000, 2,100, and 1,100 gauss, respectively. In the case of this example, the magnetic force of only about 20% of that obtained at the point near the magnet 19 was able to be obtained at the position farthest from the magnet 19, so that the magnetic forces varied considerably.

In a case where the nonmagnetic mesh members 35 and 36 are formed of a magnetic material, such as iron, the magnetic forces obtained at positions far from the magnet 19 are further reduced, so that the filtration accuracy is poor. In order to obtain a desired filtration performance, it is necessary to dispose the magnetism intensification plate 40 on the end portion of each filter media unit 12 and use a nonmagnetic material for at least the lower nonmagnetic mesh member 36.

A filtration device of the present invention can purify various fluids. It is to be understood, in carrying out the present invention, that the components of the filtration device, including the filter tank, magnetic granular filter media, magnets, nonmagnetic mesh members, magnetism intensification plates, etc., may be embodied in suitably modified forms without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A filtration device comprising:
   a filter tank into which a contaminated fluid containing fine particles to be removed is introduced;
   first and second magnets arranged horizontally spaced apart from each other in the filter tank; and
   first and second filter media units arranged horizontally adjacent to each other between the first and second magnets, and being subjected to magnetic fields by the magnets,
   each of the first and second filter media units including a filter media accommodation case and a large number of magnetic granular filter media of a magnetic material contained in the filter media accommodation case,
   the magnets being movable with respect to the filter media units between a first position and a second position and configured to apply the magnetic field to the magnetic granular filter media, thereby causing the magnetic granular filter media to magnetically attract and fix one another, when in the first position and to cancel the magnetic attraction between the magnetic granular filter media when in the second position,
   the filter media accommodation case of the first filter media unit including a first nonmagnetic mesh member formed of a horizontal, flat plate of a nonmagnetic material, the first nonmagnetic mesh member supporting the magnetic granular filter media and having a large number of circulation holes through which the contaminated fluid is passable, and a magnetism intensification plate formed of a magnetic material and provided on an end portion of the first nonmagnetic mesh member,
   the filter media accommodation case of the second filter media unit including a second nonmagnetic mesh member formed of a horizontal, flat plate of a nonmagnetic material, the second nonmagnetic mesh member supporting the magnetic granular filter media and having a large number of circulation holes through which the contaminated fluid is passable, and a magnetism intensification plate formed of a magnetic material and provided on an end portion of the second nonmagnetic mesh member, and
   the magnetism intensification plates being configured to be located between the first and second magnets when the magnets are in the first position.

2. A filtration device according to claim 1, wherein each of the nonmagnetic mesh members is formed of a nonmagnetic stainless-steel plate, in which the large number of circulation holes with an opening width smaller than the diameter of the magnetic granular filter media are formed.

3. A filtration device according to claim 2, further comprising:
- a third filter media unit located between the first magnet and one sidewall of the filter tank,
- a magnetism intensification plate of the third filter media unit being magnetically connected to the one sidewall,
- a fourth filter media unit located between the second magnet and the other sidewall of the filter tank, and
- a magnetism intensification plate of the fourth filter media unit being magnetically connected to the other sidewall.

4. A filtration device according to claim 2, wherein a frame member formed of a nonmagnetic material is disposed around the nonmagnetic mesh member of each filter media unit.

5. A filtration device according to claim 1, further comprising:
- a third filter media unit located between the first magnet and one sidewall of the filter tank,
- a magnetism intensification plate of the third filter media unit being magnetically connected to the one sidewall,
- a fourth filter media unit located between the second magnet and the other sidewall of the filter tank, and
- a magnetism intensification plate of the fourth filter media unit being magnetically connected to the other sidewall.

6. A filtration device according to claim 1, wherein a frame member formed of a nonmagnetic material is disposed around the nonmagnetic mesh member of each filter media unit.

* * * * *